(12) United States Patent
Kubek

(10) Patent No.: US 7,777,942 B2
(45) Date of Patent: Aug. 17, 2010

(54) DEVICE FOR MODIFYING THE DISTANCE BETWEEN A MICROSCOPE OBJECTIVE AND A MICROSCOPE STAGE

(75) Inventor: Martin Kubek, Hoerbach (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 457 days.

(21) Appl. No.: 11/815,820

(22) PCT Filed: Jan. 6, 2006

(86) PCT No.: PCT/EP2006/050062

§ 371 (c)(1),
(2), (4) Date: Aug. 8, 2007

(87) PCT Pub. No.: WO2006/084775

PCT Pub. Date: Aug. 17, 2006

(65) Prior Publication Data

US 2008/0080045 A1      Apr. 3, 2008

(30) Foreign Application Priority Data

Feb. 8, 2005    (DE) .................... 10 2005 005 619

(51) Int. Cl.
*G02B 21/26* (2006.01)
*G02B 21/00* (2006.01)

(52) U.S. Cl. .................. 359/392; 359/368; 359/383
(58) Field of Classification Search ............. 359/368, 359/383–384, 391–398
See application file for complete search history.

(56) References Cited

U.S. PATENT DOCUMENTS 3,019,705 A * 2/1962 Wilkinson ............... 475/3
4,445,758 A * 5/1984 Emmel .................... 359/392
4,565,427 A * 1/1986 Schilling et al. ......... 359/392

FOREIGN PATENT DOCUMENTS

DE          1186237          1/1965

OTHER PUBLICATIONS

Ernst Leitz GmbH Wetzlar, "Schul- und Kursmikroskop HM", pp. 1-6.

* cited by examiner

*Primary Examiner*—Thong Nguyen
(74) *Attorney, Agent, or Firm*—Leydig, Voit & Mayer, Ltd.

(57) ABSTRACT

Disclosed is a device for modifying the distance between a microscope table and a microscope objective. The vertical adjusting mechanism of the microscope table encompasses an eccentric member which is rotatable about a shaft. At least one actuating button is mounted on the shaft. The eccentric member is embodied such that the microscope table can be subjected to a fine or rough vertical adjustment using of the eccentric member and a monolithic actuating button.

13 Claims, 5 Drawing Sheets

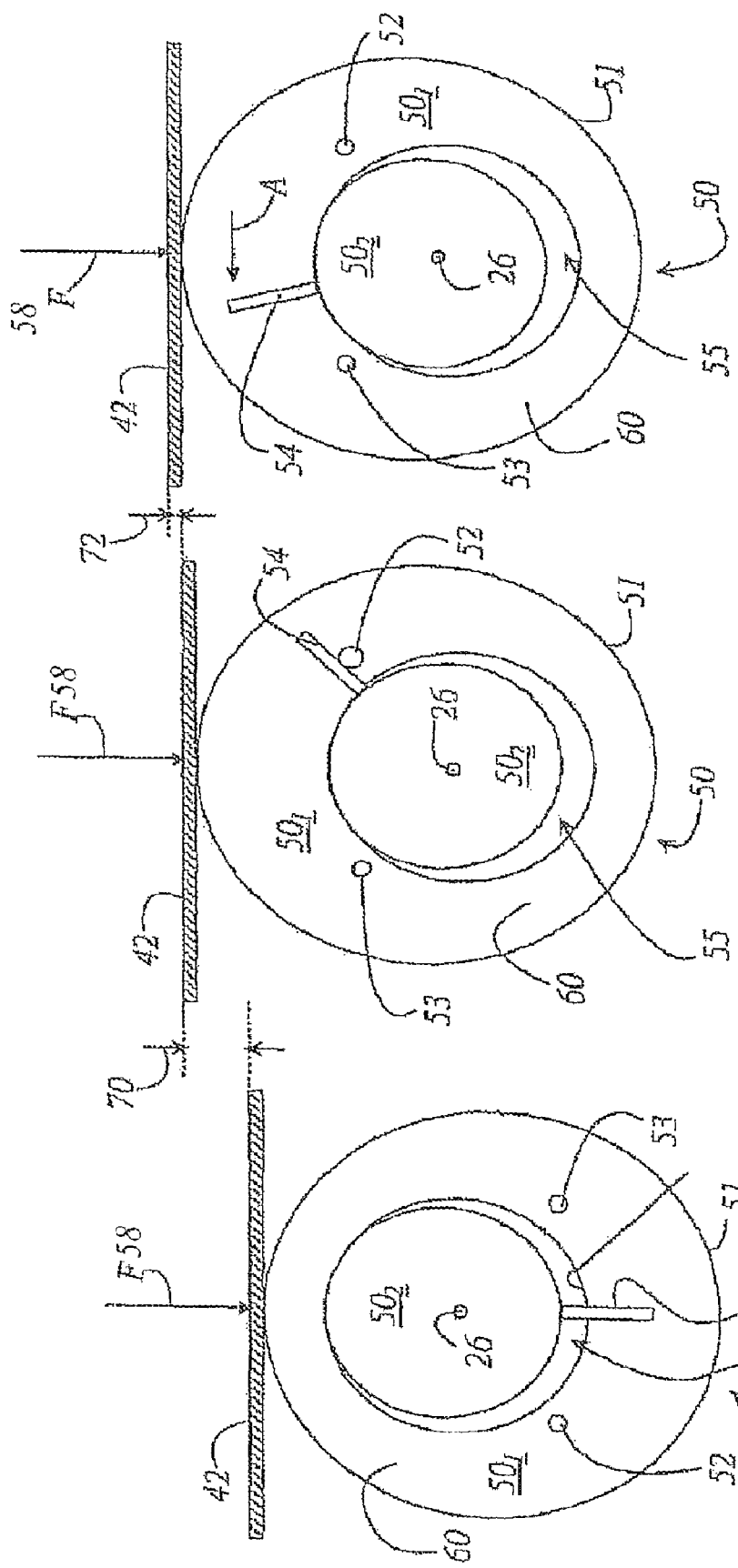

DEVICE FOR MODIFYING THE DISTANCE BETWEEN A MICROSCOPE OBJECTIVE AND A MICROSCOPE STAGE

CROSS REFERENCE TO PRIOR APPLICATION

This is a U.S. national phase application under 35 U.S.C. §371 of International Patent Application No. PCT/EP2006/050062, filed Jan. 6, 2006, and claims benefit of German Patent Application No. 10 2005 005 619.9, filed Feb. 8, 2005. The International Application was published in German on Aug. 17, 2006 as WO 2006/084775 A1 under PCT Article 21(2).

The present invention relates to a device for varying the distance between a microscope objective and a microscope stage. In particular, the present invention relates to a device for varying the distance between a microscope objective and a microscope stage, the device including an eccentric means which is rotatable about a shaft and is in operative connection with the microscope stage or with the objective. Also provided is at least one control knob connected to the shaft.

BACKGROUND

U.S. Pat. No. 3,997,239 describes a microscope composed of shell-like parts. The microscope stage is mounted to an arm and can be moved by an eccentric cam in the direction of the optical axis of the microscope. No artificial illumination is provided for the samples located on the microscope stage. Neither is there any provision for a fine adjustment of the microscope stage.

Similarly, U.S. Pat. No. 4,361,377 describes a portable compact microscope which has a plurality of adjusting elements provided on the housing. The sample to be examined is introduced through a slot in the housing. Illumination is provided by at least one conventional incandescent lamp which is connectable to a battery for power supply. No provision is made for an adjustable microscope stage.

German Patent Applications DE 102 46 277 A1 and DE 102 46 275 A1 describe a microscope whose stand consists of a minimum number of shell parts. In addition, the stand of the microscope is provided with an adjusting knob for focusing. Moreover, the microscope is narrow relative to the height of the stand, and the number of control elements is reduced to a minimum. The microscope has only a few corners and edges, which considerably reduces the risk of damage. However, the microscope is not equipped with any stage adjustment mechanism which would allow fine or coarse adjustment of the microscope stage.

The Leitz HM microscope already describes a coarse and fine focus adjustment including a one-piece control knob. Coarse and fine focus adjustment is accomplished by a plurality of mechanical transmission elements. This design does not provide a cost-effective solution.

SUMMARY

It is an object of the present invention to provide a device for varying the distance between a microscope objective and a microscope stage of an inexpensive microscope, which device is easy to manufacture and has a minimum number of moving parts.

In an embodiment, the present invention provides a distance adjustment device for a microscope stage. The distance adjustment device includes a first eccentric member, a second eccentric member and a control knob. The first eccentric member is rotatable about a shaft and bears against the microscope stage. The first eccentric member is configured, when rotated, to adjust a relative distance between the microscope stage and an objective of the microscope. The second eccentric member is disposed on the shaft so as to be freely rotatable relative to the first eccentric member within a predetermined range of rotation so as to provide a fine adjustment of the microscope stage. The second eccentric member is configured, when outside the predetermined range of rotation, to rotate the first eccentric member therewith upon a rotation of the second eccentric member. The control knob is configured to rotate the first and second eccentric members by acting on the second eccentric member.

BRIEF DESCRIPTION OF THE DRAWINGS

The subject matter of the present invention is schematically illustrated in the drawings and will be described below with reference to the Figures, in which:

FIG. 5a is a schematic view illustrating the operating principle of the height adjustment device for a microscope stage;

FIG. 5b is a schematic view illustrating the position of the first and second eccentric members which produces a height adjustment; and FIG. 5c is a schematic view illustrating the position of the first and second eccentric members which produces a fine adjustment.

DETAILED DESCRIPTION

The present invention has the advantage that the device for varying the distance between a microscope objective and a microscope stage includes an eccentric means which is rotatable about a shaft. The eccentric means is in operative connection with the microscope stage or with the microscope objective and has at least one control knob connected to the shaft. The eccentric means is designed in such a way that fine and coarse distance adjustment of the microscope stage can be made using the eccentric member device and a one-piece control knob.

The eccentric means is composed of a first eccentric member and a second eccentric member. The coarse distance adjustment can be made using the first eccentric member, while the fine distance adjustment can be made using the second eccentric member. Only the first eccentric member is in operative connection with the microscope stage. The first eccentric member is formed with an eccentric hole, in which the second eccentric member is rotatably mounted. The second eccentric member has a pin formed thereon which cooperates with two stops provided on the first eccentric member.

The first eccentric member has a greater eccentricity than the second eccentric member. The ratio of the eccentricity of the first eccentric member to the eccentricity of the second eccentric member is between 10 and 25. Engagement of the pin of the second eccentric member against one of the stops of the first eccentric member results in a coarse distance adjustment of the microscope stage. Movement of the pin of the second eccentric member between the stops of the first eccentric member results in a fine distance adjustment of the microscope stage.

The microscope stage includes a sample support part, a guide part, and a base. The first eccentric member is disposed such that its periphery presses against the base of the microscope stage.

The first eccentric member and the second eccentric member are rotatably supported on a common shaft. The shaft itself is mounted in a mounting block. A thrust member connected to the mounting block acts on a side surface of the first eccentric member. The thrust member prevents the first eccentric member from rotating when a fine adjustment is made through rotation of the second eccentric member. A force F is provided which continuously presses an inner peripheral surface of the first eccentric member against an outer peripheral surface of the second eccentric member. The guide part of the microscope stage slides in the recess defined by one housing shell.

When the eccentric means cooperates with the microscope stage, then this is referred to as a coarse and fine vertical adjustment of the microscope stage relative to the objective in the working position. When the eccentric means cooperates with the microscope objective, then this is referred to as a coarse and fine distance adjustment of the microscope objective relative to the microscope stage.

Figure 1:
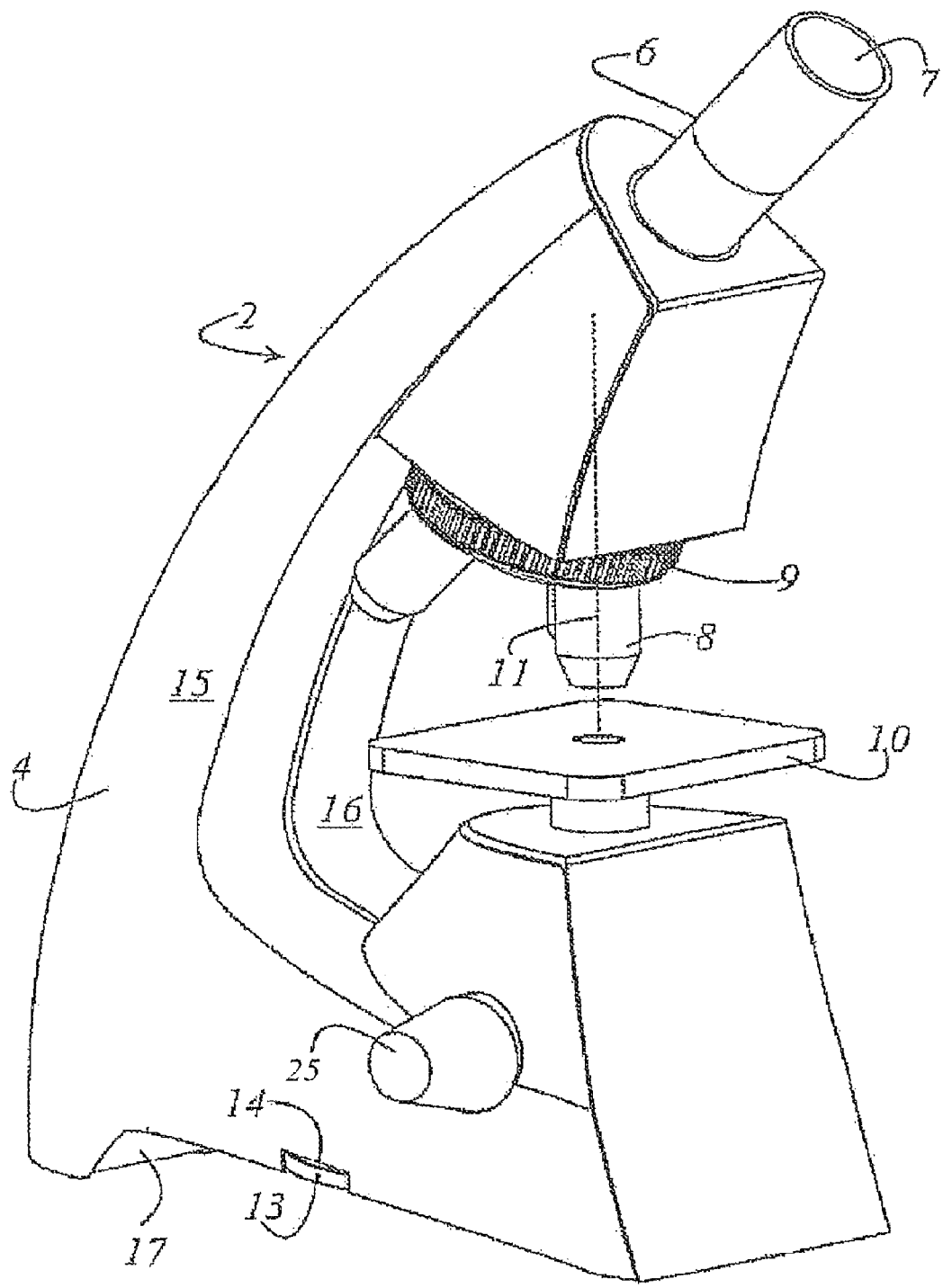
FIG. 1 is a perspective view of the microscope containing the height adjustment device according to the present invention.

FIG. 1 shows microscope 2 in a perspective view. Microscope 2 includes a stand 4 on which are provided an eyepiece tube 6, at least one objective 8 and a microscope stage 10 which is adjustable in height. In the embodiment shown in FIG. 1, microscope 2 is provided with a turret 9 which can carry several objectives. Using turret 9, a particular objective 8 desired by the user can be moved into an optical axis 11 defined by microscope 2. An eyepiece 7 is mounted in eyepiece tube 6. Furthermore, an control knob 25 is provided at least on one side of stand 4, said control knob 25 allowing microscope stage 10 to be adjusted in height relative to objective 8 in the direction of optical axis 11. Moreover, a potentiometer wheel 13 projects through an opening 14 provided in one side of stand 4. Potentiometer wheel 13 allows the user to control the brightness of a light source provided in the stand. Stand 4 of microscope 2 is composed of a first housing shell 15, a second housing shell 16, and a base member 17.

Figure 2:
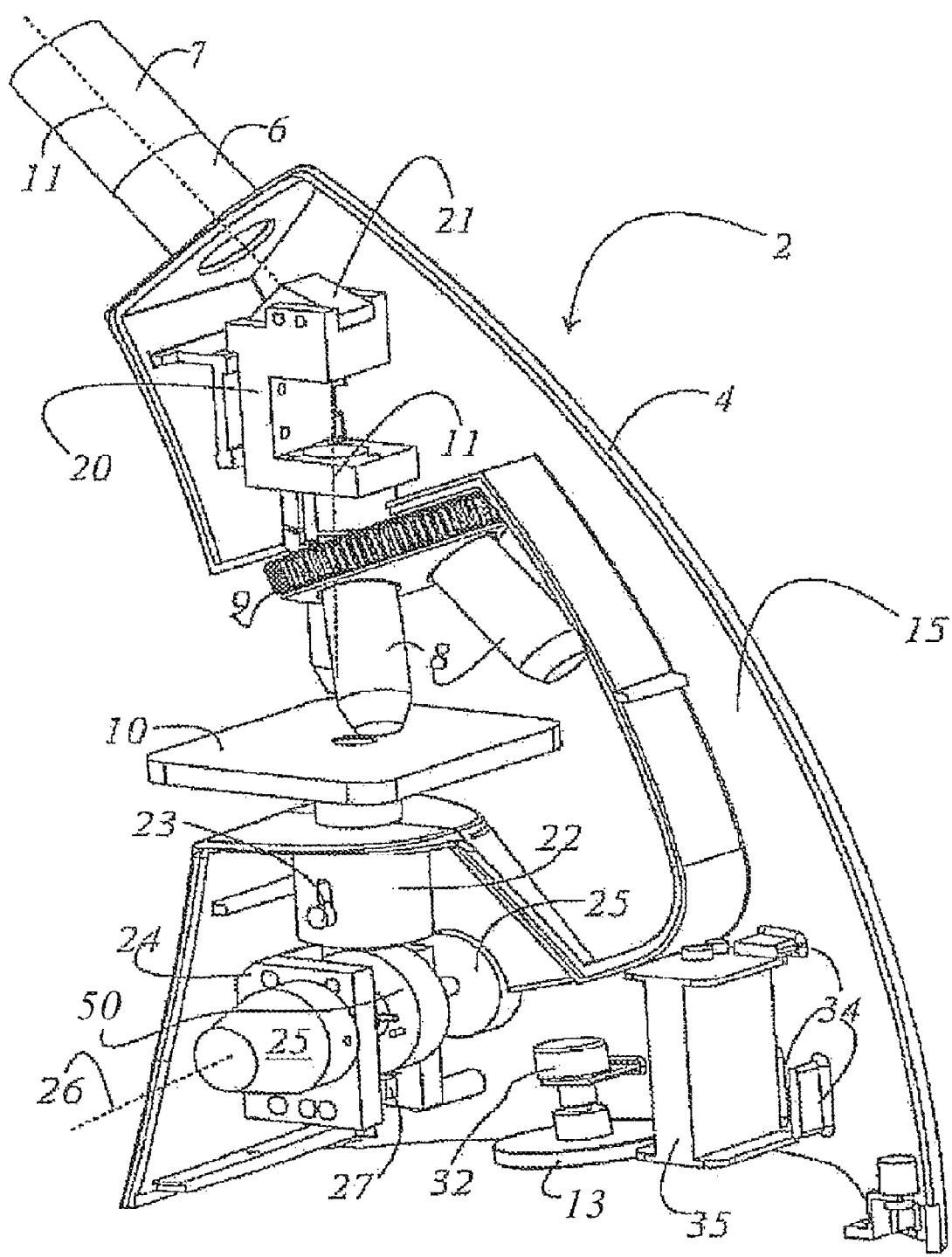
FIG. 2 is a perspective inside view of a housing shell in which the individual components of the microscope are mounted.

FIG. 2 is a perspective inside view of the first housing shell 15 of stand 4 of microscope 2. Microscope turret 9 is rotatably mounted on the second housing shell 16. Using said microscope turret, one of a plurality of objectives 8 can be moved at a time into an optical axis 11 defined by the microscope. A prism holder 20 is provided above the objective turret 9. Prism holder 20 carries a prism 21 which folds optical axis 11 into eyepiece 7 in a suitable manner. First housing shell 15 also carries microscope stage 10. Microscope stage 10 is guided in a guide sleeve 22, so that it can be moved in a direction along optical axis 11. A locking pin 23 ensures that the movement of microscope stage 10 along optical axis 11 is limited, and at the same time provides linear guidance in a suitable manner. A mounting block 24 is provided below the guide sleeve 22 for microscope stage 10. The mounting block carries at least one control knob 25 which is mounted on a shaft extending through mounting block 24. Also mounted on shaft 26 is an eccentric means 50 which allows the microscope stage to be adjusted in height, i.e., in the direction of optical axis 11. In addition, a limit switch 27 is provided in the lower region of eccentric means 50, said limit switch interrupting power to a light source (see FIG. 3) when microscope stage 10 is lowered. Moreover, first housing shell 15 has provided therein a potentiometer 32 which allows adjustment of the brightness of the light source. The potentiometer 32 is operated from outside the first housing shell 15 using the corresponding potentiometer wheel 13. Holding members 34 for a battery holder 35 are formed on the inside of first housing shell 15. As already mentioned, battery 35 is used to supply power to the light source provided in the microscope.

Figure 3:
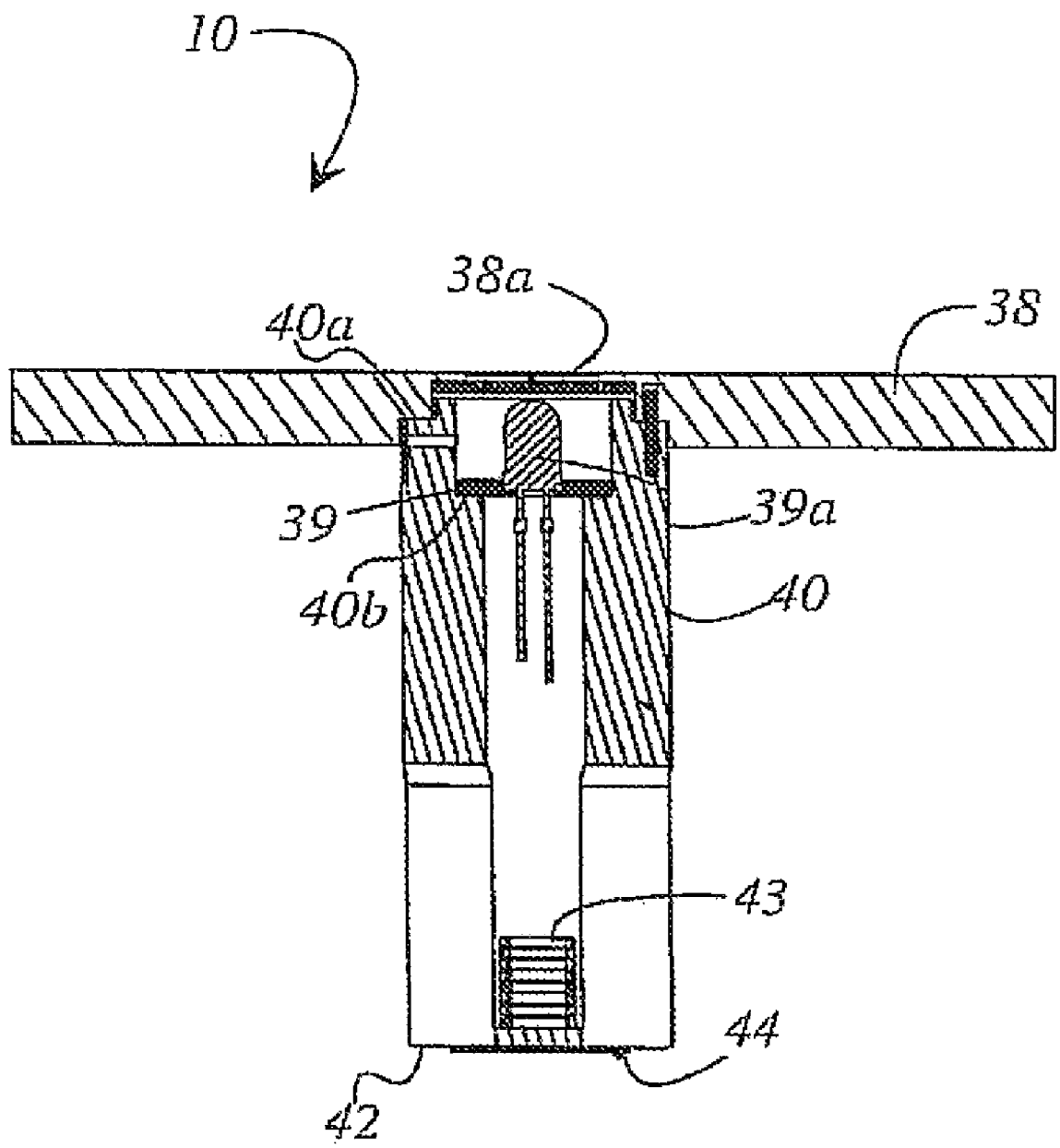
FIG. 3 is a cross-sectional view of the microscope stage, illustrating the interior thereof.

Microscope stage 10 is shown in detail in FIG. 3. Microscope stage 10 forms a unit and is composed of a sample support part 38 and a cylindrical guide part 40. Cylindrical guide part 40 is closed at one end by a base 42 and at the other end by sample support part 38. Guide part 40 has mounted therein a holder for an illumination module 39. Illumination module 39 may include the electronics and light source. It has turned out to be particularly suitable to use an LED as the light source. Sample support part 38, cylindrical guide part 40, and base 42 form one unit. This ensures simple and inexpensive final assembly of the entire microscope 2. A transparent element 38a is provided in sample support part 38. Transparent element 38a allows passage of the light generated by illumination module 39. In addition, transparent element 38a (diffusing screen) also provides protection against external influences. Illumination module 39 serves to generate white light. The white light is emitted by at least one light-emitting diode 39a mounted on illumination module 39. The diffusing panel ensures a homogeneous distribution of the light. Illumination module 39 rests against lower circumferential step 40b of guide part 40. Guide part 40 is further formed with a circumferential step 40a which is located at the end opposite base 42 and used for connecting sample support part 38 to guide part 40. A spring 43 is disposed on the base of guide part 40 to provide a restoring force for microscope stage 10. It is obvious that such a spring must be provided on the microscope objective or on the microscope turret when the change in distance between the microscope stage and the microscope objective is accomplished only by movement of the microscope objective or of the microscope turret along the optical axis. Also provided on base 42 of guide part 40 is a sliding plate 44 which reduces friction between eccentric means 50 and base 42.

Figure 4:
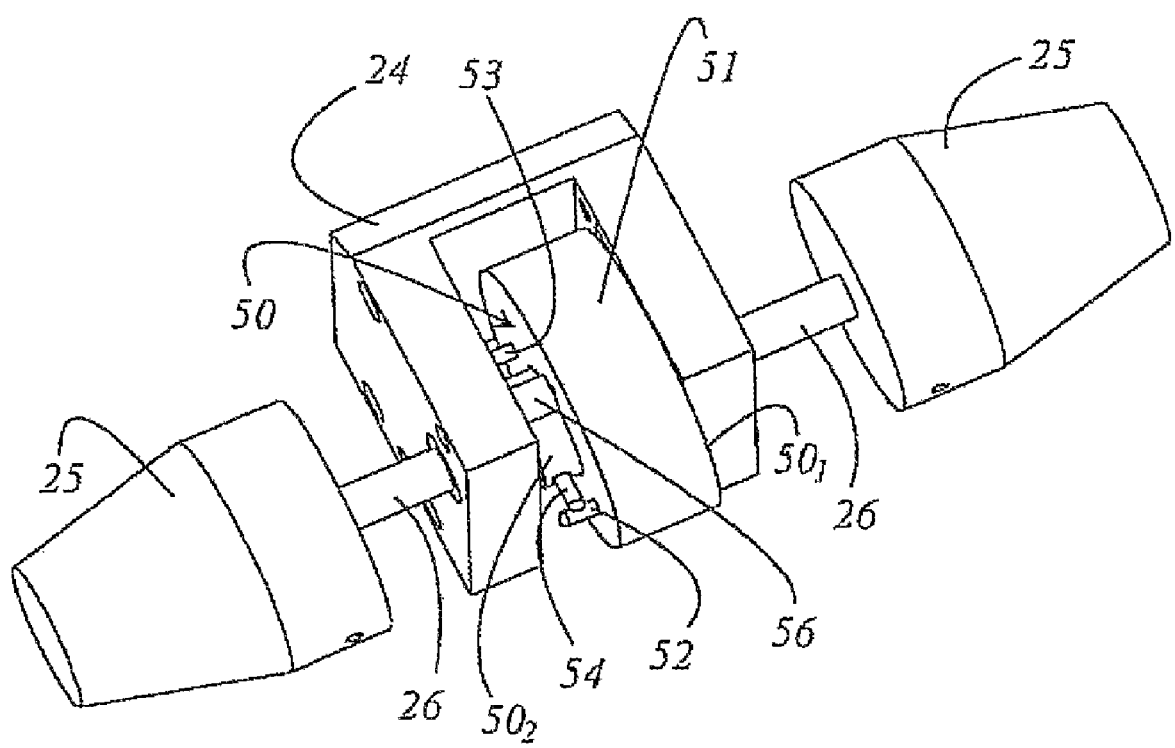
FIG. 4 is a perspective view of the height adjustment device for the microscope stage.

FIG. 4 is a perspective view illustrating the height adjustment device for microscope stage 10. The height adjustment device includes a mounting module 24 which is mounted in housing shell 15. Mounting module 24 supports a shaft 26 which carries a control knob 25 on each of the two sides of mounting module 24. Shaft 26 can be rotated by means of control knob 25. Mounting module 24 is U-shaped and carries an eccentric means 50 within the open portion of the U. Eccentric means 50 is formed with an outer surface 51 which is in operative connection or contact with base 42 of microscope stage 10. Eccentric means 50 includes a first eccentric member $50_1$ and second eccentric member $50_2$. First eccentric member $50_1$ and second eccentric member $50_2$ are both mounted on shaft 26. First eccentric member $50_1$ has formed thereon a first stop 52 and a second stop 53. First stop 52 and second stop 53 cooperate with a pin 54 formed on the second eccentric member $50_2$. Also provided on mounting module 24 is an adjustable thrust member 56 which presses against first eccentric member $50_1$. The purpose of thrust member 56 is to limit the rotary movement of first eccentric member $50_1$ in both directions. Because of this, rotation of second eccentric member $50_2$ generates only a lifting force on first eccentric member $50_1$, thus effecting the fine vertical adjustment of microscope stage 10. The coarse adjustment of microscope stage 10 can be done using first eccentric member $50_1$, while the fine adjustment of microscope stage 10 can be accomplished by rotating second eccentric member $50_2$. When pin 54 of second eccentric member $50_2$ abuts against one of stops 52 or 53 of first eccentric member $50_1$ and control knobs 25 are rotated, then the coarse distance adjustment of microscope stage 10 is effected. When pin 54 of second eccentric member $50_2$ can move freely between stops 52 and 53 of first eccentric member $50_1$, then the fine vertical adjustment of microscope stage 10 is performed.

FIG. 5a shows eccentric means 50 in operative connection with base 42 of microscope stage 10. In FIG. 5a, the microscope stage is shown in a lowered position. First eccentric member $50_1$ has a peripheral surface 51 which is always in contact with base 42 of the microscope stage, irrespectively of the position of the microscope stage. The first eccentric member $50_1$ is formed with a hole 55, in which second eccentric member $50_2$ is mounted. Second eccentric member $50_2$ is formed with a pin 54 which is movable between a first stop 52 and a second stop 53. First stop 52 and second stop 53 are formed on a side surface 60 of first eccentric member $50_1$. A force F biases the microscope stage with respect to eccentric means 50 in such a manner that eccentric means 50 always bears with its peripheral surface 51 against base 42 of the microscope stage.

FIG. 5b illustrates the situation after a maximum vertical adjustment 70 has been made by rotating eccentric means 50. The maximum vertical adjustment 70 is accomplished by means of the coarse distance adjustment. At the beginning of the coarse distance adjustment, pin 54 of second eccentric member $50_2$ rests against one of stops 52 or 53 of first eccentric member $50_1$. Further rotation causes first eccentric member $50_1$ to rotate about shaft 26. The maximum coarse distance adjustment provided by first eccentric member $50_1$ is determined by the degree of eccentricity of first eccentric member $50_1$.

FIG. 5c shows a maximum vertical adjustment 72 provided by the fine vertical adjustment. The fine vertical adjustment is effected by the movement of pin 54 of second eccentric member $50_2$ between stops 52 and 53. When pin 54 moves between stops 52 and 53, thrust member 56 (see FIG. 4) prevents rotation of first eccentric member $50_1$. Thus, since force F continuously presses first eccentric member $50_1$ lightly against second eccentric member $50_2$, the relative small height adjustment 72 is produced, it being possible for said small height adjustment to be accomplished without any play.

In the following, specific dimensions of the height adjustment device will be disclosed. However, it will be obvious to those skilled in the art that this is only a specific example, and that any modifications thereof are within the ordinary skill of one in the art. When the eccentricity of first eccentric member $50_1$ is selected to be 1.8 mm, the maximum adjustment sensitivity obtained is approximately 0.033 mm/degree, given a manufacturing tolerance of, for example, +/−0.1 mm. This allows trouble-free focusing with an objective having a magnification of many times, such as with a 4× and 10× objective. After rotating first eccentric member $50_1$ by 180°, a maximum vertical travel of 3.6 mm+/−0.2 mm is possible. If first eccentric member $50_1$ has a useful working range, or range of rotation, from 0 to 143°, the resulting vertical adjustment 70 is at least 3 mm. It should be considered that when focusing with a 40× magnification objective, the user may very quickly move out of the depth-of-field range by an estimated 5° when using first eccentric member $50_1$. (i.e., the coarse distance adjustment). It is then desired that the difference in vertical travel resulting in the case of the 5° be able to be traveled back using second eccentric member $50_2$ to allow for comfortable focusing. In order to accomplish this comfortable focusing, pin 54 of second eccentric member $50_2$ is moved between stops 52 and 53. This is indicated by arrow A in FIG. 5c. Thus, in the worst case, one must be able to travel about 0.165 mm using second eccentric member $50_2$. This is achieved when the eccentricity is about 0.140 mm and the working range is defined to be from 46° to 136°. Then, the maximum adjustment sensitivity provided by second eccentric member $50_2$ is about 2.3 m/degree. Vertical adjustment 70 provided by first eccentric member $50_1$ and vertical adjustment 72 provided by second eccentric member $50_2$ add up to a total vertical travel of about 3.2 mm.

The present invention is not limited to the exemplary embodiment described herein.

What is claimed is:

1. A distance adjustment device for a microscope stage, comprising:
    a first eccentric member rotatable about a shaft and bearing against the microscope stage, the first eccentric member being configured, when rotated, to adjust a relative distance between the microscope stage and an objective of the microscope;
    a second eccentric member disposed on the shaft so as to be freely rotatable relative to the first eccentric member within a predetermined range of rotation so as to provide a fine adjustment of the microscope stage, the second eccentric member being configured, when outside the predetermined range of rotation, to rotate the first eccentric member therewith upon a rotation of the second eccentric member; and
    a control knob configured to rotate the first and second eccentric members by acting on the second eccentric member.

2. The device as recited in claim 1 wherein the first eccentric member is configured to provide a coarse distance adjustment, and wherein the second eccentric member is configured to provide a fine distance adjustment.

3. The device as recited in claim 1 wherein the first eccentric member includes an eccentric hole, and wherein the second eccentric member is rotatably mounted in the eccentric hole.

4. The device as recited in claim 1 wherein the second eccentric member includes a pin, and wherein the first eccentric member includes first and second stops configured to cooperate with the pin.

5. The device as recited in claim 4 wherein the pin of the second eccentric member and the stops of the first eccentric member are configured to cooperate so as to provide a coarse distance adjustment of at least one of the microscope stage and the objective of the microscope by engagement of the pin against one of the stops.

6. The device as recited in claim 4 wherein the pin of the second eccentric member and the stops of the first eccentric member are configured to cooperate so as to provide a fine distance adjustment of at least one of the microscope stage and the objective of the microscope by the movement of the pin between the stops.

7. The device as recited in claim 1 wherein the first eccentric member has a greater eccentricity than the second eccentric member.

8. The device as recited in claim 1 wherein a ratio of an eccentricity of the first eccentric member to an eccentricity of the second eccentric member is between 10 and 25.

9. The device as recited in claim 1 wherein the microscope stage includes a sample support part, a guide part, and a base, and wherein a periphery of the first eccentric member is configured to press against at least one of a base of the microscope stage and the objective of the microscope.

10. The device as recited in claim 1 further comprising a mounting module configured to rotatably support the shaft.

11. The device as recited in claim 10 further comprising a thrust member connected to the mounting module and configured to act on a side surface of the first eccentric member.

12. The device as recited in claim 11 wherein the thrust member is configured to prevent the first eccentric member from rotating when the fine adjustment is made through rotation of the second eccentric member.

13. The device as recited in claim 1 wherein a force continuously presses an inner peripheral surface of the first eccentric member against an outer peripheral surface of the second eccentric member.

* * * * *